United States Patent
Hung et al.

(10) Patent No.: US 9,052,815 B2
(45) Date of Patent: Jun. 9, 2015

(54) TOUCH SENSING DEVICE AND APPARATUS AND TOUCH SENSING METHOD

(71) Applicant: MStar Semiconductor, Inc., Hsinchu County (TW)

(72) Inventors: Guo-Kiang Hung, New Taipei (TW); Hsuan-I Pan, Taipei (TW)

(73) Assignee: MSTAR SEMICONDUCTOR, INC, Hsinchu County (TW)

( * ) Notice: Subject to any disclaimer, the term of this patent is extended or adjusted under 35 U.S.C. 154(b) by 131 days.

(21) Appl. No.: 13/674,288

(22) Filed: Nov. 12, 2012

(65) Prior Publication Data
US 2013/0141363 A1 Jun. 6, 2013

(30) Foreign Application Priority Data
Dec. 2, 2011 (TW) .............................. 100144500 A (51) Int. Cl.
G06F 3/041 (2006.01)
G06F 3/0488 (2013.01)
G06F 3/044 (2006.01)

(52) U.S. Cl.
CPC ............ *G06F 3/0488* (2013.01); *G06F 3/0416* (2013.01); *G06F 3/044* (2013.01)

(58) Field of Classification Search
None
See application file for complete search history.

(56) References Cited

U.S. PATENT DOCUMENTS

| | | | |
|---|---|---|---|
| 2008/0162967 A1* | 7/2008 | Wilson et al. | 713/322 |
| 2010/0265211 A1* | 10/2010 | Oishi et al. | 345/174 |
| 2012/0068964 A1* | 3/2012 | Wright et al. | 345/174 |
| 2012/0109455 A1* | 5/2012 | Newman et al. | 701/36 |

FOREIGN PATENT DOCUMENTS

TW 201126391 A1 8/2011

OTHER PUBLICATIONS

Taiwan Intellectual Property Office, "Office Action", Feb. 26, 2014.

* cited by examiner

*Primary Examiner* — Adam R Gisey
(74) *Attorney, Agent, or Firm* — WPAT, PC; Justin King (57) ABSTRACT

A touch sensing device is provided. The touch sensing device includes a multiplexer and a control unit, and is electrically connected to a touch panel. The touch panel includes a plurality of first-direction electrodes; a plurality of second-direction electrodes; and a dielectric layer, for generating at least one electric field change corresponding to at least one touch point in response to the at least one touch point. The at least one electric field change is generated at an overlapping region of the first-direction and second-direction electrodes. The multiplexer is electrically connected to the touch panel via the first-direction and second-direction electrodes, and selectively performs voltage driving or voltage sensing for the first-direction and second-direction changes a control signal to be transmitted to the multiplexer and receives a sense signal from the multiplexer.

12 Claims, 5 Drawing Sheets

| P11 | P12 | P13 | P14 | P15 | P16 | P17 | P18 |
|-----|-----|-----|-----|-----|-----|-----|-----|
| P21 | P22 | P23 | P24 | P25 | P26 | P27 | P28 |
| P31 | P32 | P33 | P34 | P35 | P36 | P37 | P38 |
| P41 | P42 | P43 | P44 | P45 | P46 | P47 | P48 |
| P51 | P52 | P53 | P54 | P55 | P56 | P57 | P58 |
| P61 | P62 | P63 | P64 | P65 | P66 | P67 | P68 |
| P71 | P72 | P73 | P74 | P75 | P76 | P77 | P78 |
| P81 | P82 | P83 | P84 | P85 | P86 | P87 | P88 |
| P91 | P92 | P93 | P94 | P95 | P96 | P97 | P98 |
| P101 | P102 | P103 | P104 | P105 | P106 | P107 | P108 |
| P111 | P112 | P113 | P114 | P115 | P116 | P117 | P118 |
| P121 | P122 | P123 | P124 | P125 | P126 | P127 | P128 |

FIG. 6A

| P11 | P12 | P13 | P14 | P15 | P16 | P17 | P18 |
|-----|-----|-----|-----|-----|-----|-----|-----|
| P21 | P22 | P23 | P24 | P25 | P26 | P27 | P28 |
| P31 | P32 | P33 | P34 | P35 | P36 | P37 | P38 |

FIG. 6B

| P11 | P12 | P13 | P14 | P15 | P16 | P17 | P18 |
|-----|-----|-----|-----|-----|-----|-----|-----|
| P21 | P22 | P23 | P24 | P25 | P26 | P27 | P28 |
| P31 | P32 | P33 | P34 | P35 | P36 | P37 | P38 |

FIG. 6C

| P11 | P12 | P13 | P14 | P15 | P16 | P17 | P18 |
|-----|-----|-----|-----|-----|-----|-----|-----|
| P21 | P22 | P23 | P24 | P25 | P26 | P27 | P28 |
| P31 | P32 | P33 | P34 | P35 | P36 | P37 | P38 |

FIG. 6D

TOUCH SENSING DEVICE AND APPARATUS AND TOUCH SENSING METHOD

This application claims the benefit of Taiwan application Ser. No. 100144500, filed Dec. 2, 2011, the subject matter of which is incorporated herein by reference.

BACKGROUND OF THE INVENTION

1. Field of the Invention

The invention relates in general to a touch sensing device, touch sensing apparatus, and a touch sensing method thereof, and more particularly, to a touch sensing device and touch sensing apparatus that is able to switch between an idle mode and an active mode using a touch sensing method thereof.

2. Description of the Related Art

Touch sensing apparatuses are now prevalent in various applications. Based on known sensing principles, touch sensing apparatus are generally categorized into resistive, capacitive, ultrasonic, and optic (infrared) types. Among the above types, a capacitive touch panel features relatively high light transmittance since materials thereof are nearly transparent, such as glass. Moreover, a transparent conductive film made of indium tin oxide (ITO) in a capacitive touch sensing apparatus offers better durability, and therefore the capacitive touch sensing apparatuses have become widely adopted.

In short, an operating principle of a capacitive touch sensing apparatus is that, a coordinate (position) of a touch point is detected according to induced current of a capacitance change caused by distortion of a static electricity field resulting from the combination of a transparent electrode and a human body upon contact. More specifically, when a user finger touches a surface of a touch sensing device, due to the conductivity of the human skin, a capacitance change between transparent electrodes is incurred by a user press. Such an electric change is transmitted to a touch sensing device, which accordingly calculates position information of the touch point.

Based on different types of sensing capacitors, approaches that a capacitive touch sensing apparatus obtains a touch position may further be categorized into a self capacitance calculation approach and a mutual capacitance calculation approach. A main difference between these two approaches is that, the self-capacitive detection is based on a capacitance change generated at all X-direction electrodes or all Y-direction electrodes, whereas the mutual-capacitive detection is based on a capacitance change occurring at an electrode overlapping region of electrodes.

Figure 1A:
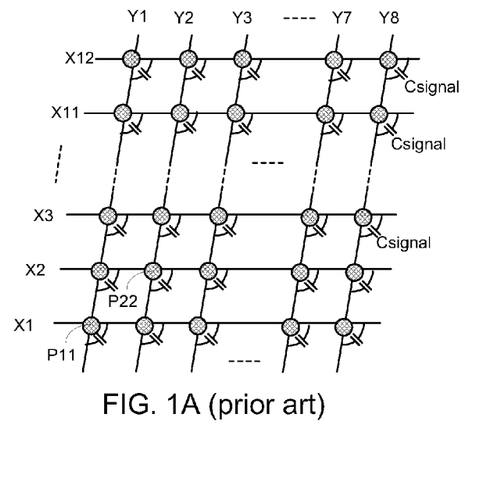
FIG. 1A is a schematic diagram of sensing a touch position through mutual capacitance between electrodes of different directions by implementing a double-layer touch sensing apparatus.

FIG. 1A shows a schematic diagram of sensing a touch position through mutual capacitance between electrodes of different directions by implementing a double-layer touch sensing apparatus according to the prior art. A first plane and a second plane of the capacitive touch sensing apparatus respectively include a plurality of transparent electrodes. Between the two planes lies a dielectric layer for forming the mutual capacitance between the electrodes.

Referring to FIG. 1A, the first plane includes twelve parallel transparent electrodes X1 to X12 arranged and extended along the horizontal direction (X direction); the second plane includes eight parallel transparent electrodes Y1 to Y8 arranged and extended along the vertical direction (Y direction). The horizontal (X-direction) transparent electrodes are isolated from the vertical (Y-direction) transparent electrodes by the dielectric layer.

Between each X-direction transparent electrode and each Y-direction transparent electrode forms a mutual capacitance Csignal. Thus, in FIG. 1A, 12*8=96 mutual capacitances are formed at overlapping regions of the electrodes for sensing and positioning a touch. For example, between the transparent electrode X1 and the transparent electrode Y1 is an electrode overlapping region P11, on which a mutual capacitance is formed. Similarly, a mutual capacitance on an electrode overlapping region P22 is formed by the transparent electrode X2 and the transparent electrode Y2.

Figure 1B:
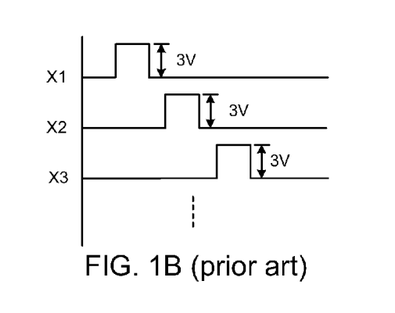
FIG. 1B is a waveform of sequentially applying a drive voltage to horizontal driving electrodes in a conventional mutual-capacitive touch sensing apparatus.

FIG. 1B shows waveforms of the horizontal driving electrodes while being sequentially applied a drive voltage in a conventional mutual-capacitive touch sensing apparatus. For brevity, assume the X-direction transparent electrodes X1 to X12 are driving electrodes, being sequentially driven under the control of the touch sensing device.

Assuming the drive voltage is 3V, a 3V voltage is respectively applied to the transparent electrodes X1, X2, . . . , X12 in the X direction. More specifically, when the transparent electrode X1 is driven by the 3V voltage, the remaining transparent electrodes in the X direction are not provided with the drive voltage. Similarly, for the remaining driving electrodes, when one of the X-direction transparent electrodes is driven, the rest of the transparent electrodes are not driven.

Figure 1C:
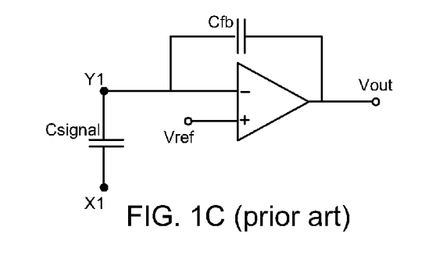
FIG. 1C is a schematic diagram of voltage driving and voltage sensing on the mutual capacitance formed at an electrode overlapping region of transparent electrodes X1 and Y1.

The Y-direction transparent electrodes Y1 to Y8 are sensing electrodes for sensing mutual capacitance changes. The voltage level sensed by the sensing electrodes when the touch sensing apparatus is not pressed is different from that sensed by the sensing electrodes when the touch sensing apparatus receives a press. Relationships of the voltage level sensed by the sensing electrodes, the touch point and the mutual capacitance shall be described with reference to FIG. 10.

FIG. 10 shows a schematic diagram of voltage driving and voltage sensing on the mutual capacitance formed at an electrode overlapping region of the transparent electrodes X1 and Y1 according to the prior art. The Y-direction sensing electrode Y1 and a reference voltage Vref are respectively coupled to a negative input and a positive input of an amplifier. Between the negative input and the positive input of the amplifier is a feedback capacitance Cfb with a predetermined and known capacitance value. Between the X-direction driving electrode X1 and the Y-direction sensing electrode Y1 is a mutual capacitance Csignal, whose capacitance value changes when a touch occurs thereupon. Further, an output voltage Vout is coupled to an analog-to-digital converter (ADC) for measuring the voltage.

It can be seen from FIG. 1B that, a 3V voltage is sequentially applied to the X-direction electrodes in a scanning process. Taking the electrode overlapping region P11 as an example, when the driving electrode X1 is driven, the voltage level of the sensing electrode Y1 changes as the value of the mutual capacitance Csignal decreases when voltage sensing is performed on the sensing electrode Y1.

Therefore, by measuring the voltage of the Y-direction sensing electrodes, it may be determined whether a touch event takes place. When a touch event takes place, a voltage difference between two ends of the mutual capacitance Csignal changes accordingly. Based on the known capacitance value of the feedback capacitance Cfb, the capacitance change of the mutual capacitnace may be obtained through an equation $\Delta Vout = -Vy*(Csignal/Cfb)$ according to the measured outputted voltage Vout and the voltage level (3V) of the sensing electrode Vy1, so as to further provide position information of a touch point.

Figure 2A:
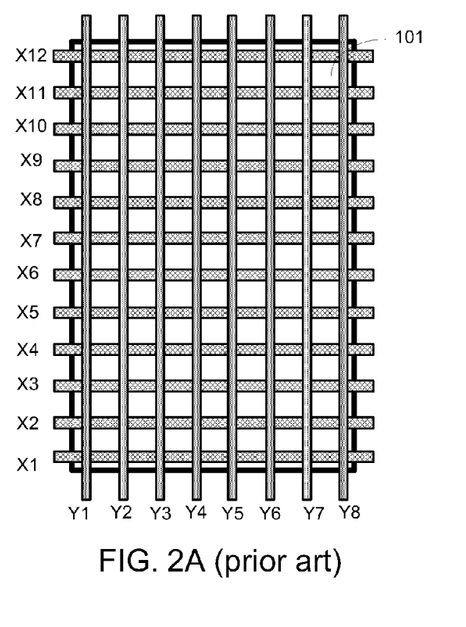
FIG. 2A is a schematic diagram of a conventional touch sensing apparatus operating under an active mode for detecting a mutual capacitance change between electrodes.

FIG. 2A shows a schematic diagram of a conventional touch sensing apparatus operating under an active mode for detecting a mutual capacitance change between electrodes. A first plane includes a plurality of first-direction electrodes X1 to X12; a second plane includes a plurality of second-direction electrodes Y1 to Y8.

A transparent dielectric layer 101 (a dielectric layer) is disposed between the first plane and the second plane. When a touch event occurs, corresponding electricity changes are generated at overlapping regions of the first-direction electrode and the second-direction electrodes in response to the touch event. That is, the capacitance value of mutual capacitance is changed due to the touch event.

For brevity, the driven transparent electrodes are indicated as shaded driving electrodes, whereas the transparent electrodes that are not driven are indicated as unshaded driving electrodes. Similarly, the sensing transparent electrodes are indicated as shaded sensing electrodes, whereas the transparent electrodes that are not sensing are indicated as unshaded sensing electrodes. Further, to distinguish the driving electrodes from the sensing electrodes, the sensing electrodes are more densely shaded than the driving electrodes.

In the conventional technique, when the touch sensing apparatus is in an active mode, the first-direction electrodes (driving electrodes) located on the first plane are sequentially and cyclically driven. Thus, for the whole touch panel, to perform a complete scanning process of an image, a drive voltage is applied sequentially to the driving electrodes X1 to X12, followed by again scanning toward the driving electrode X1 after having scanned toward the driving electrode X12.

Figure 2B:
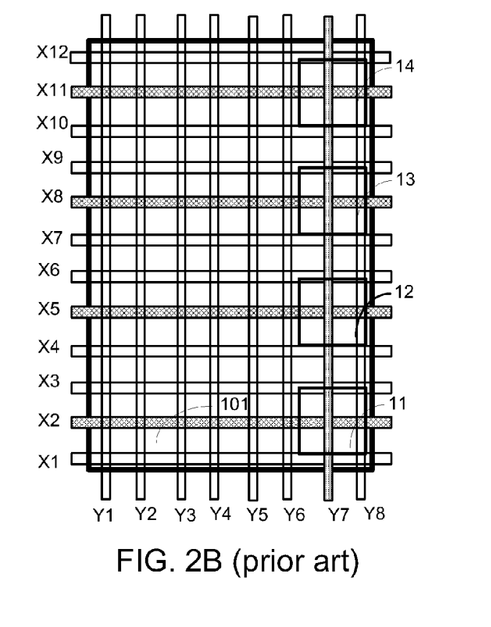
FIG. 2B is a schematic diagram of a conventional touch sensing apparatus operating under an idle mode for detecting a mutual capacitance change between electrodes.

FIG. 2B shows a schematic diagram of a conventional touch sensing apparatus operating in a standby (idle) mode for detecting a mutual capacitance change between electrodes. In the standby (idle) mode, the touch sensing apparatus does not sequentially drive all the driving electrodes or sense all the sensing electrodes. Alternatively, the touch sensing apparatus selectively drives corresponding driving electrodes and senses corresponding electrodes according to positions of sensing regions 11, 12, 13, and 14.

Assume that the touch sensing apparatus only provides a user with the four sensing regions 11, 12, 13, and 14 in an idle mode. The touch sensing apparatus only proceeds with subsequent processes when at least one of the four sensing regions is touched. That is, only when a touch event is sensed and confirmed at the sensing regions, the touch sensing apparatus switches the operating mode from the idle mode to the active mode.

An example is shown in FIG. 2B, the four sensing regions respectively include overlapping regions formed by the driving electrodes X2, X5, X8, and X11, and the sensing electrodes Y7 and Y8. While operating in the idled mode, the touch sensing apparatus only selectively scans the four sensing regions where the driving electrodes X2, X5, X8, and X11 pass through.

It is concluded from the above descriptions that, in the idle mode, the conventional technique needs to drive a corresponding number of driving electrodes according to the number of touch sensing regions. That is, in the idle mode, in order to determine whether a touch event takes place, the conventional technique needs to apply the drive voltage to the four transparent electrodes X2, X5, X8, and X11 and respectively scan the transparent sensing electrode Y7 when the four transparent electrodes X2, X5, X8, and X11 are driven. Yet, such approach is rather power consuming especially when there is a large number of sensing regions. Therefore, there is a need for a solution to the above issues.

SUMMARY OF THE INVENTION

The invention is directed to a touch sensing apparatus comprising a control unit and a multiplexer for dynamically adjusting a voltage driving target on a touch panel, so as to enhance signal quality of the touch sensing apparatus and reduce power consumption as well as to lower production cost of the touch sensing apparatus.

According to an aspect of the present invention, a touch sensing device is provided. The touch sensing device is electrically connected to a touch panel. The touch panel comprises a plurality of first-direction electrodes disposed on a first plane, a plurality of second-direction electrodes disposed on a second plane, and a dielectric layer disposed between the first plane and the second plane. The touch sensing device comprises: a multiplexer, electrically connected to the touch panel via the plurality of first-direction electrodes and the plurality of second-direction electrodes, for selectively performing voltage driving and voltage sensing on the plurality of first-direction electrodes and the plurality of second-direction electrodes; and a control unit, electrically connected to the multiplexer, for transmitting a control signal, transmitting a drive signal to the multiplexer, and receiving a sense signal from the multiplexer in response to an operating mode.

According to another aspect of the present invention, a touch sensing apparatus is provided. The touch sensing apparatus comprises a touch panel and a touch sensing device. The touch panel comprises a plurality of electrode plates. The touch panel comprises: a multiplexer, electrically connected to the electrode plates, for voltage driving one of the electrode plates and voltage sensing electrode plates adjacent to the driven electrode plate; and a control unit, electrically connected to the multiplexer, for controlling the multiplexer in response to different time points.

According to yet another aspect of the present invention, a touch sensing method for a touch panel is provided. The touch panel comprises a plurality of electrode plates. The method comprises: voltage driving a first electrode plate selected via a multiplexer at a first time point, and voltage sensing a plurality of electrode plates adjacent to the first electrode plate selected via the multiplexer; and voltage driving a second electrode plate selected via the multiplexer at a second time point, and voltage sensing a plurality of electrode plates adjacent to the second electrode plate selected via the multiplexer. The first electrode plate and the second electrode plate are arranged in a same direction.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 3:
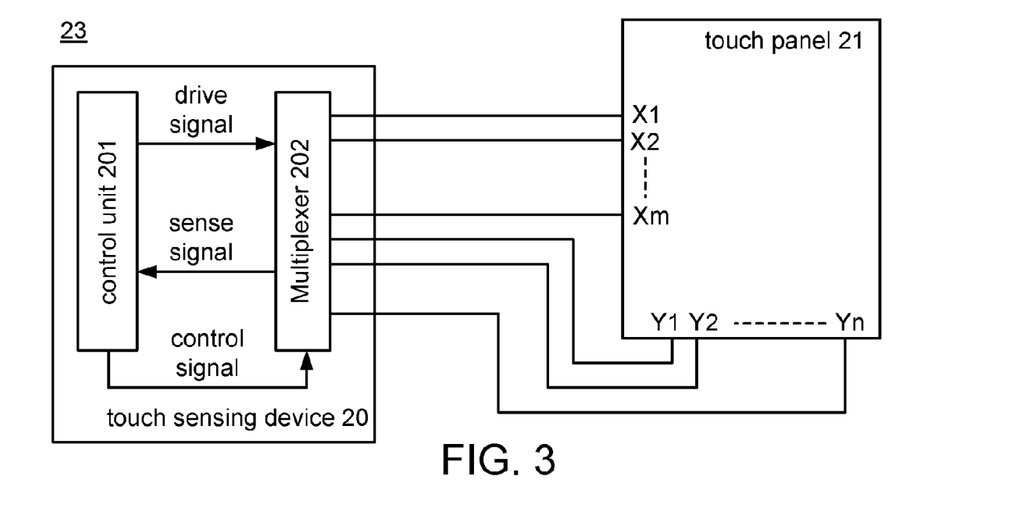
FIG. 3 is a schematic diagram of an internal structure of a touch sensing apparatus according to a first preferred embodiment of the present invention.

FIG. 3 shows a schematic diagram of an internal structure of a touch sensing apparatus according to a first preferred embodiment of the present invention. A touch sensing apparatus 23 includes a touch sensing device 20 and a touch panel 21. The touch panel 21 includes a plurality of first-direction electrodes disposed on a first plane, and a plurality of second-direction electrodes disposed on a second plane.

The touch sensing device 20 includes a control unit 201 and a multiplexer 202. The multiplexer 202 is electrically connected to the touch panel 21 via the first-direction electrodes X1, X2, . . . , Xm and the second-direction electrodes Y1, Y2, . . . , Yn. In response to the control of the control unit 201, the multiplexer 202 selectively performs voltage driving or voltage sensing on the first-direction electrodes X1, X2, . . . , Xm and the second-direction electrodes Y1, Y2, . . . , Yn.

According to the present invention, in response to requirements of a touch control process, the control unit 201 transmits a corresponding control signal to the multiplexer 202. In one embodiment, the control unit 201 changes the control signal in response to switching of an operating mode of the touch sensing apparatus, so as to further change a target electrode to which a drive signal is transmitted and whose sense signal is transmitted to the control unit 201. That is to say, after receiving the signals, the multiplexer 202 correspondingly switches the operating mode of the first-direction electrodes X1, X2, . . . , Xm and the second-direction electrodes Y1, Y2, . . . , Yn.

According to the present invention, functions of the first-direction electrodes X1, X2, . . . , Xm and the second-direction electrodes Y1, Y2, . . . , Yn are not predefined and limited as functions of electrodes described in the prior art. That is, in the present invention, the first-direction electrodes X1, X2, . . . , Xm are not limited to be utilized as driving electrodes and the second-direction electrodes Y1, Y2, . . . , Yn are not limited to be utilized as sensing electrodes, and vice versa.

In principle, the concept of the present invention is concluded as, through the control unit 201 and the multiplexer 202, the arrangement of driving electrodes and sensing electrodes may be switchable; functions of the electrodes may be changed in response to an operating mode, thereby reducing power consumption and cost of the touch sensing apparatus 23.

According to the first preferred embodiment of the present invention, under an active mode, the multiplexer 202 selects the first-direction electrodes for voltage driving and selects the second-direction electrodes for voltage sensing. That is, the first-direction electrodes X1, X2, . . . , and Xm along the X direction serve as driving electrodes, and the second-direction electrodes Y1, Y2, . . . , Yn along the Y direction serve as sensing electrodes. On the other hand, when the touch sensing apparatus 23 is in an idle mode, the multiplexer 202 selects at least one of the first-direction electrodes for voltage sensing, and selects at least one of the second-direction electrodes for voltage driving.

Figure 4:
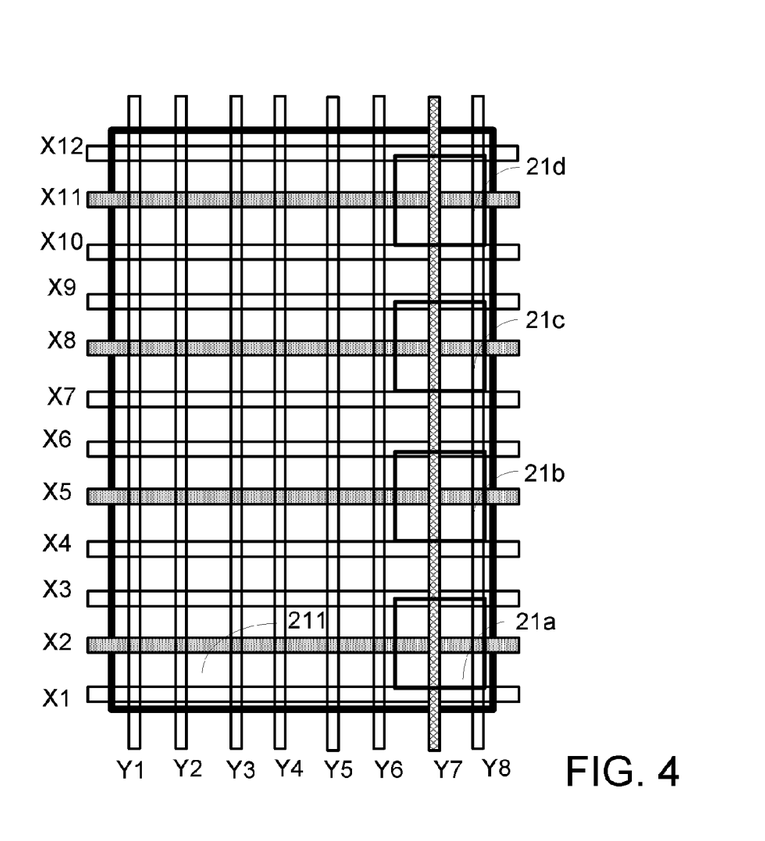
FIG. 4 is a schematic diagram of switching driving electrodes and sensing electrodes when a touch sensing apparatus is under an idle mode according to the first preferred embodiment of the present invention.

FIG. 4 shows a schematic diagram of switching the driving electrodes and sensing electrodes when the touch sensing apparatus is in the idle mode according to the first preferred embodiment of the present invention. For comparison purposes, FIG. 4 is depicted in continuation to the prior art shown in FIG. 2B, i.e., four sensing regions 21a, 21b, 21c, and 21d are provided in the idle mode. Only when at least one of the sensing regions is touched, the touch sensing apparatus 23 proceeds to subsequent processes and switches to the active mode. The structure in FIG. 4 shall be described with reference to FIG. 3 to get a better understanding of advantages offered by this embodiment of the present invention.

When the touch sensing apparatus 23 is in the active mode, the control unit 201 controls the multiplexer 202 to switch the first-direction electrodes X1, X2, . . . , and X12 to driving electrodes and the second-direction electrodes Y1, Y2, . . . , and Y8 to sensing electrodes. On the other hand, when the touch sensing apparatus 23 is in the idle mode, the control unit 201 controls the multiplexer 202 via a control signal to switch the first-direction electrodes X1, X2, . . . , and X12 to sensing electrodes and the second-direction electrodes Y1, Y2, . . . , and Y8 to driving electrodes.

Therefore, for the four sensing regions 21a, 21b, 21c, and 21d under the idle mode according to the first preferred embodiment of the present invention, only the second-direction electrode Y7 needs to be driven and the voltage changes of the first-direction electrodes X2, X5, X8 and X11 need to be sensed. That is, through the approach of flexibly adjusting the functions of the electrodes, the touch sensing apparatus 23 is allowed to scan with a smaller number of electrodes in the idle mode, meaning that the number of driving electrode provided with the drive voltage is also reduced.

Thus, it is easily appreciated that, the touch sensing in the active mode remains the same; in the idle mode, since the drive voltage is only required for one of the second-direction electrodes, the present invention is capable of reducing the number of electrodes to be driven and the number of scanning. As a result, the above approach according to the present invention increases a scanning speed of the touch sensing apparatus to increase a signal-to-noise ratio (SNR). Alternatively, for a touch sensing apparatus with a same SNR, the touch sensing apparatus of the present invention achieves lower power consumption.

More specifically, the above approach allows the electrodes with the dynamically adjustable arrangement to adapt to system requirements, so that response time and signal quality as well as power consumption are optimized to enhance the overall performance of touch sensing. Therefore, the above approach can be applied to various types of transparent conductive films or touch sensing apparatuses of different techniques.

According to the first preferred embodiment of the present invention, when the touch sensing apparatus 23 is in the idle mode, it determines whether a user wishes to initiate touch sensing operations through merely applying the drive voltage to one electrode Y7 and performing scanning for one time. In contrast, in order to determine whether a touch event occurs, the conventional technique needs to provide the drive voltage to four electrodes X2, X5, X8, and X11 and to respectively scan the electrode Y7 when the electrodes X2, X5, X8, and X11 are driven. That is to say, within a same period of time, the touch sensing apparatus 23 realized by the present invention is capable of obtaining four times of information of that obtained by the conventional technique while also increasing the scanning speed.

Thus, the noise sensing capability of the touch sensing device 20 is also increased. In the subsequent noise processing, the touch sensing device 20 is then able to reduce noise effects on the signal, such that distortion is lowered when restoring the control signal.

Assuming that a same scan rate as the conventional technique is adopted, i.e., under the premise that a same SRN is maintained, in the touch sensing apparatus 23 of the present invention, the touch sensing device 20 drives the touch panel 21 with less power due to the smaller number of electrodes to be driven, thereby offering the touch sensing apparatus 23 with a longer standby duration under the idle mode.

Therefore, according to the first preferred embodiment of the present invention, increased SNR or reduced power consumption can be achieved. In this embodiment, an approach for dynamically adjusting functions and an arrangement of the electrodes on the touch panel 21 is provided, so that the touch sensing apparatus 20 may flexibly change the functions of the electrodes in response to different operating modes of the touch sensing apparatus 23. That is, in the active mode, the first-direction electrodes X1, X2, . . . , and Xm serve as driving electrodes whereas the second-direction electrodes Y1, Y2, . . . , and Yn serve as sensing electrodes; in the idle mode, the first electrodes X1, X2, . . . , and Xm serve as sensing electrodes whereas the second-direction electrodes Y1, Y2, . . . , and Yn serve as driving electrodes.

Figure 5A:
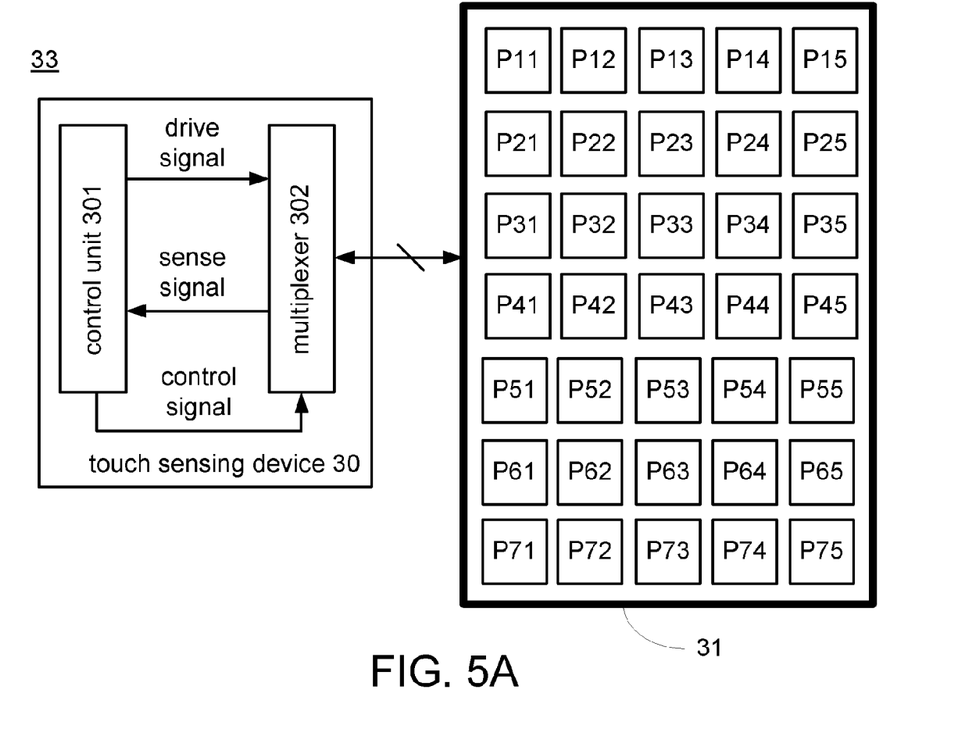
FIG. 5A is a schematic diagram of a plurality of electrodes that are not in contact with one another on a single plane of a touch panel.

According to a second preferred embodiment of the present invention set forth in FIG. 5A, a touch sensing apparatus 33 includes a touch sensing device 30 and a touch panel 31 comprising a plurality of electrode plates. The electrode plates are located on a same plane, and functions of the electrode plates are selectively controlled via a control unit 301 and a multiplexer 302. In other words, the electrode plates may serve as driving electrodes or sensing electrodes in response to a selection made by the multiplexer 302.

Referring to FIG. 5A, a single plane of the touch panel 31 includes a plurality of electrode plates that are isolated to one another. Taking 35 electrode plates (P11 to P75) in a 5×7 matrix arrangement as an example, each of the electrode plates has a signal wire connected to the multiplexer 302. For illustrative purposes, the electrode plates are numbered according to a row number and a column number. For example, a first-row and first-column electrode plate is numbered as P11, and so forth. According to the second preferred embodiment of the present invention, the control unit 301 controls functions of the electrode plates P11 to P75 via control signals.

It should be noted that, in the second preferred embodiment, the electrodes in a matrix arrangement may be disposed on a single plane of the touch panel 31. Accordingly, the cost for the transparent conductive film may be eliminated in the manufacturing process of the touch sensing apparatus. Further, the transparency of the touch panel 31 of the touch sensing apparatus 30 is also increased in the absence of the transparent conductive film.

Figure 5B:
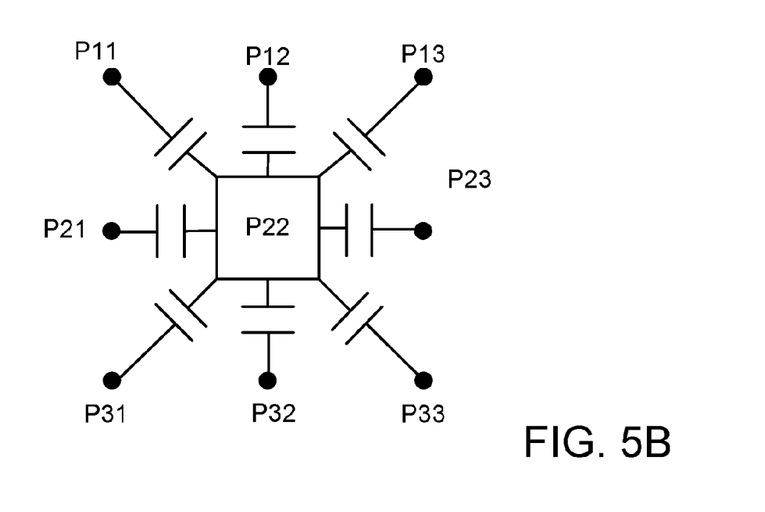
FIG. 5B is a schematic diagram of touch sensing performed by the electrodes in a matrix arrangement according to the second preferred embodiment of the present invention.

FIG. 5B shows a schematic diagram of touch sensing performed by the electrodes in a matrix arrangement according to the second preferred embodiment of the present invention. Nine upper electrode plates of the touch panel 31 are taken as an example. That is, a 3×3 matrix formed by the first-row electrode plates P11, P12, and P13, the second-row electrode plates P21, P22, and P23, and the third-row electrode plates P31, P32, and P33 is taken as an example. In the 3×3 matrix, the electrode plate P22 for voltage driving is represented by a quadrilateral, and the remaining electrode plates P11, P12, P13, P21, P23, P31, P32, and P33 for voltage sensing are respectively represented by a dot.

Referring to FIG. 5B, when the control unit 301 transmits a control signal to the multiplexer 302, the electrode plate P22 is selected for voltage driving, and the electrode plates P11, P12, P13, P21, P23, P31, P32, and P33 are selected for voltage sensing. Since a mutual capacitance Csignal is respectively formed between the electrode plate P22 and the electrode plates P11, P12, P13, P21, P23, P31, P32, and P33, the mutual capacitance Csignal may be utilized as basis for determining whether a touch event takes place at the position of the electrode plate P22.

Among the electrode plates forming the 3×3 matrix in this embodiment, the drive voltage is provided by the electrode plate located at the center, and the sense voltage of the remaining eight electrode plates neighboring the driving electrode is measured. Thus, according the change in the measured sense voltage, it is determined whether the mutual capacitance Csignal between every two electrode plates is changed to further determine whether a touch event takes place at the electrode plate located at the center of the 3×3 matrix.

Accordingly, the electrode plates of the touch panel may be individually selected as the center of a 3×3 matrix as in the above description, and the electrode plates forming the 3×3 matrix are scanned to similarly determine whether a touch event occurs.

Figure 6A:
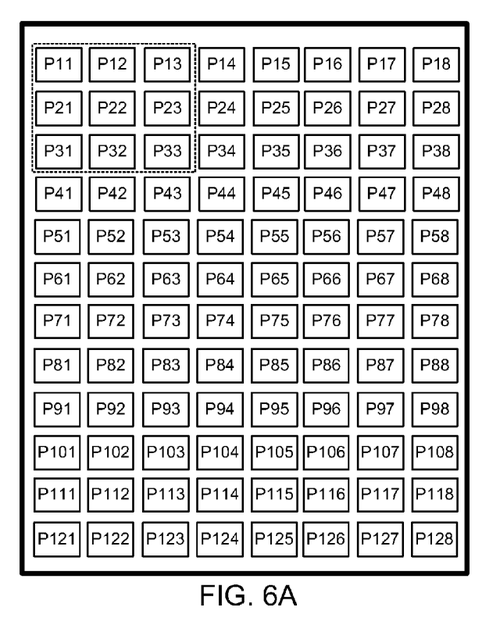
FIG. 6A is a schematic diagram of selecting electrode plates of a touch panel as a 3×3 matrix according to the second preferred embodiment of the present invention.

FIG. 6A shows a schematic diagram of selecting the electrode plates of the touch panel as a 3×3 matrix according to the second preferred embodiment of the present invention. In accordance with the denotations in FIG. 5A, the touch panel 31 comprising 8×12 electrode plates is taken as an example.

Assuming that nine electrode plates at the upper left corner are first selected, and illustrations for sequentially changing the selection of the 3×3 matrix shall be given with reference to FIGS. 6B to 6D below. In the descriptions below, assuming that the control unit sequentially selects the electrodes from left to right and from top to bottom. At different time points, a drive voltage is first applied from left to right to the second-row electrode plates, and the voltages of the electrode plates around the driven electrode plates are sensed, respectively; a drive voltage is then applied from left to right to the third-row electrodes, and the voltage of the electrode plates around the driven electrode plates is sensed, respectively; and so forth.

Figure 6B:
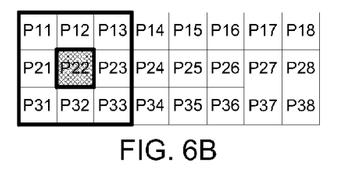
FIGS. 6B to 6D are schematic diagrams of sequentially selecting electrodes as a 3×3 matrix at first, second, and third time points from left to right according to the approach in FIG. 6A, respectively.
Figure 6C:
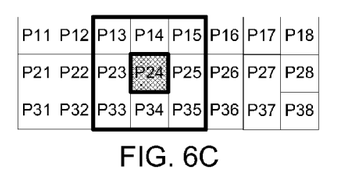
Figure 6D:
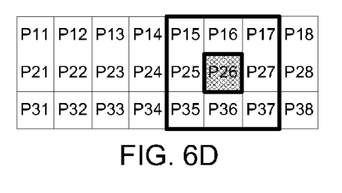

FIGS. 6B to 6D show schematic diagrams of sequentially selecting nine electrode plates forming a 3×3 matrix at first, second and third time points from left to right according to the approach in FIG. 6A, respectively. Assuming that the first time point is earlier than the second time point, and the second time point is earlier than the third time point. It should be noted that, in the diagrams, the electrode plates are depicted as joining one another for illustrative purposes. However, the electrode plates are physically arranged without contacting one another as shown in FIG. 6A.

Further, also for illustrations, FIGS. 6B to 6D only depict first-row to third-row electrode plates in FIG. 6A, with electrodes for determining a touch event being indicated by a thicker frame line. Among the nine electrode plates indicated by the thicker frame line, the electrode plate receiving the applied voltage is shaded, and the remaining eight electrode plates around the shaded electrode plate is utilized for voltage sensing.

With reference to FIGS. 6B to 6D, how a 3×3 matrix is selected as a range for sequentially scanning the electrodes of the touch panel shall be described below. The description focuses on the scanning process; details of sensing and determining a touch point are as described with reference to FIG. 5A and FIG. 5B, and shall be omitted for brevity.

At the first time point represented by FIG. 6B, a drive voltage is applied to the electrode plate P22, and a sense voltage represented by the electrode plates P11, P12, P13, P21, P23, P31, P32, and P33 are measured to determine whether a touch event occurs at the electrode plate P22. At the second time point represented by FIG. 6C, the 3×3 matrix selected includes the electrodes P13, P14, P15, P23, P24, P25, P33, P34, and P35. Among the selected nine electrode plates, a drive voltage is applied to the electrode plate P24, and a voltage sensed for the remaining eight electrode plates. Similarly, at the third time point represented by FIG. 6D, the electrode P26 serves as the drive electrode, and operation details are as in the above two examples in FIG. 6C and 6D.

As shown in FIGS. 6B and 6C, in the touch sensing method of the present invention, at the first time point (FIG. 6B), the first electrode plate P22 is selected for voltage driving via the multiplexer 302, and a plurality of electrode plates neighboring the first electrode plates are selected for voltage sensing via the multiplexer 302. At the second time point (FIG. 6C), the second electrode plate P24 is selected for voltage driving via the multiplexer 302, and a plurality of electrode plates neighboring the second electrode plates are selected for voltage sensing via the multiplexer 302.

In the touch sensing method, the first electrode plate and the second electrode plate are located in a same direction. For example, the first electrode plate and the second electrode plate are spaced by one electrode plate as shown in the above embodiment, or are adjacent to each other.

An order for scanning the electrode plates in the 3×3 matrix at different time points is not limited. For example, apart from scanning from left to right, the scanning process may also be performed in a zigzag, from top to bottom, or other manners based on application requirements.

It is seen from the two preferred embodiments of the present invention that, function of the electrodes may be flexibly selected in response to the selection of the multiplexer 202 under the control of the control unit 201. In the two preferred embodiments, the functions of the electrodes are switched in a grouped approach in the first preferred embodiment, and a drive voltage or a sense voltage is dynamically provided to an electrode overlapping region in the second preferred embodiment.

In the first preferred embodiment, it is illustrated that SNR is increased or power consumption is reduced. In the second preferred embodiment, it is further illustrated that the transparent conductive film is eliminated when applying the present invention to a single plane touch panel to reduce the cost of the touch sensing apparatus. That is to say, the touch sensing apparatus of the present invention improves not only touch control quality and power consumption but also cost.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch sensing device, electrically connected to a touch panel, the touch panel comprising a plurality of first-direction electrodes disposed on a first plane and a plurality of second-direction electrodes disposed on a second plane, and a dielectric layer disposed between the first plane and the second plane, the touch sensing device comprising:
a multiplexer, electrically connected to the touch panel via the plurality of first-direction electrodes and the plurality of second-direction electrodes, for selective voltage driving or voltage sensing the plurality of first-direction electrodes and the plurality of second-direction electrodes according to an operating mode; and
a control unit, electrically connected to the multiplexer, for transmitting a control signal, transmitting a drive signal to the multiplexer, and receiving a sense signal from the multiplexer in response to the operating mode;
wherein when the operating mode is an active mode, the multiplexer selects and voltage drives the plurality of first-direction electrodes according to the control signal, and selects and voltage senses the plurality of second-direction electrodes; and when the operating mode is an idle mode, the multiplexer selects and voltage senses at least one of the first-direction electrodes according to the control signal, and selects and drives at least one of the second-direction electrodes.

2. The device according to claim 1, wherein the drive signal is for driving the electrode selected via the multiplexer for voltage driving, and the sense signal is for sensing the electrode selected via the multiplexer for voltage sensing.

3. The device according to claim 1, wherein the plurality of first-direction electrodes are parallel to each other, the plurality of second-direction electrodes are parallel to each other, and the plurality of second-direction electrodes are perpendicular to the plurality of first-direction electrodes.

4. A touch sensing apparatus, comprising:
a touch panel, comprising a first electrode plate and a plurality of second electrode plates, wherein said first electrode plate and said second electrode plate are adjacent to each other in a single layer; and
a touch sensing device, comprising:
a multiplexer, electrically connected to said first electrode plate and said second electrode plate, for voltage driving said first electrode plate and voltage sensing said second electrode plates; and
a control unit, electrically connected to the multiplexer, for controlling the multiplexer in response to different time points.

5. The apparatus according to claim 4, wherein when a touch point is located on said first electrode plate, a voltage change occurs between the first electrode plate and said second electrode plates.

6. The apparatus according to claim 4, wherein the first electrode plate and second electrode plate are in a plurality of electrode plates and are arranged in a matrix on a same plane in a non-connecting manner.

7. The apparatus according to claim 4, wherein the control unit selects a first electrode plate for voltage driving at a first time point via the multiplexer, and selects a second electrode plate for voltage driving at a second time point via the multiplexer, where the first and second electrode plates are adjacent to each other.

8. The apparatus according to claim 4, wherein the first electrode plate and the second voltage sensed electrode plates are arranged in a matrix, and the second electrode plates are adjacent to the first electrode plate and are respectively located at upper left, upper, upper right, left, right, lower left, lower, and lower right sides of the first electrode.

9. A touch sensing method, for a touch panel comprising a plurality of electrode plates in a single layer, the method comprising:

voltage driving a first electrode plate selected via a multiplexer at a first time point, and voltage sensing a plurality of second electrode plates adjacent to the first electrode plate selected via the multiplexer; and voltage driving a third electrode plate selected via the multiplexer at a second time point, and voltage sensing a plurality of fourth electrode plates adjacent to the third electrode plate selected via the multiplexer;

wherein, the first electrode plate and the third electrode plate are arranged in a same direction.

10. The method according to claim 9, wherein when a touch point is located at a position of the first electrode plate, a voltage change occurs between the first electrode plate and the second electrode plates.

11. The method according to claim 9, wherein the electrode plates are arranged in a matrix on a same plane in a non-connecting manner.

12. The method according to claim 9, wherein the first electrode plate and the second electrode plates are arranged in a matrix, and the second electrode plates are adjacent to the first electrode plate and are respectively located at upper left, upper, upper right, left, right, lower left, lower and lower right sides of the first electrode plate.

* * * * *